Nov. 9, 1971 T. W. McLORG Re. 27,232

AIR-SUPPORTED SHELTER

Original Filed March 13, 1967

INVENTOR.
TERENCE WYNDHAM McLORG
BY Maybee & Legris
ATTORNEYS

United States Patent Office

Re. 27,232
Reissued Nov. 9, 1971

27,232

AIR SUPPORTED SHELTER

Terence Wyndham McLorg, 34 Thorncrest Drive, Islington, Ontario, Canada

Original No. 3,391,504, dated July 9, 1968, Ser. No. 622,708, Mar. 13, 1967. Application for reissue May 22, 1970, Ser. No. 39,878
Int. Cl. E04b *1/345*
U.S. Cl. 52—2 9 Claims

Matter enclosed in heavy brackets [ ] appears in the original patent but forms no part of this reissue specification; matter printed in italics indicates the additions made by reissue.

ABSTRACT OF THE DISCLOSURE

The invention relates to an air supported shelter for sheltering a large ground area from the elements. The shelter may be permanent, for covering a city for example, or temporary, for covering an exhibition ground or sports arena. The shelter consists of a reinforced flexible, translucent, membrane spanning the area and supported by internal area pressure. Air outlets are provided at the tops of the domed membrane sections, and fresh air is drawn or pumped into the enclosed space from its periphery, this air generally rising and passing into the atmosphere via the outlets.

This invention relates to a shelter which may be used to establish a high degree of control over the total environment within a large ground area, the shelter being of the kind comprising a flexible membrane which is supported by air.

In such a shelter the membrane is necessarily subjected to quite high tensile stresses and reinforcing strands or cables generally must be provided for carrying these stresses. It has previously been proposed to construct a shelter of this kind comprising a membrane forming a large dome, the dome spanning the area to be enclosed and being supported by a system of tension cables and tethering cables. A dome in accordance with the prior proposals may be used for large areas of up to hundreds of feet across, but would be quite unsuitable for a large city occupying an area of many square miles, primarily because of the enormous stresses that would be set up in a membrane of such a size, and also because of the practical problems of draining precipitation from the upper surface of the membrane. Since the tensile stresses set up in such a dome are a function of its area, and since the drainage problems are magnified in proportion to the area and linear dimensions of the dome, there is obviously a limit to the size of shelter which can be built in practice.

It is an object of this invention to provide a shelter of the kind referred to, in which the tensile stress set up in the membrane is independent of the total area of the membrane. This is achieved by constructing the membrane of a number of sections disposed in edge to edge relation, adjacent edges being secured together, each section being integral with its own system of reinforcing or tension cables, to which ground-engaging tethering cables are anchored at the edges of the membrane. The membrane sections each assume a dome shape when the shelter is inflated, and each tethering cable is common to a plurality of tension cables, of different sections, meeting at a point; in this way the tensile stress in any one membrane section is a function of the excess internal air pressure over atmospheric, the area of the one membrane section, and the curvature of the dome, but not of the total number of sections.

The cooperating sides of adjacent sections form a system of drainage channels on the top of the membrane, and water may be drained from these channels by pipes or tubes communicating with the channels at suitably spaced points. Preferably the tethering cables are tubular and form the means for draining water from the channels.

One preferred embodiment of the invention will now be described, by way of example, with reference to the accompanying drawings, in which.

Figure 1:
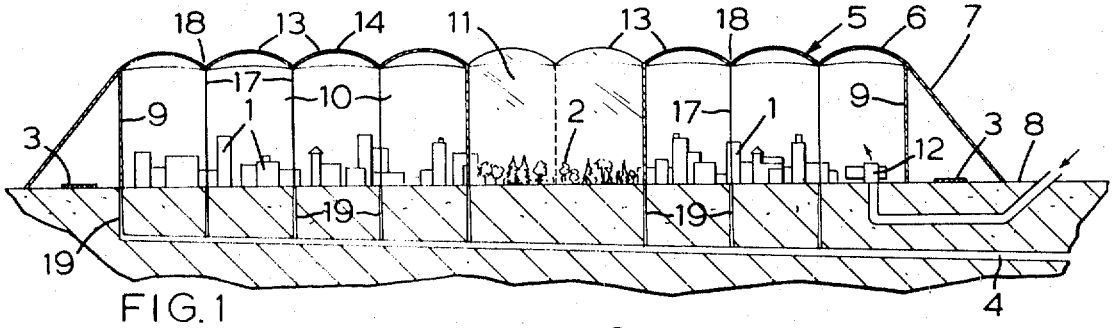
FIG. 1 is a cross sectional elevation of a shelter constructed over a city having an area of several square miles.
Figure 2:
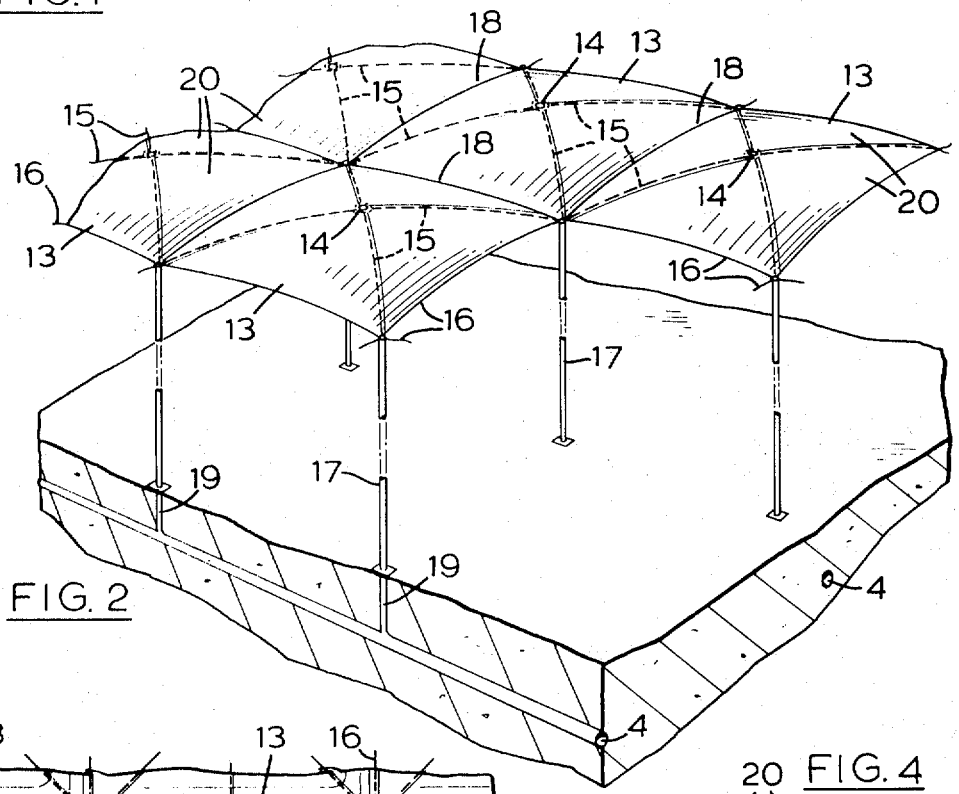
FIG. 2 is a fragmentary part-sectional view of the shelter, the figure showing a portion of the membrane and a section of part of the ground.
Figure 3:
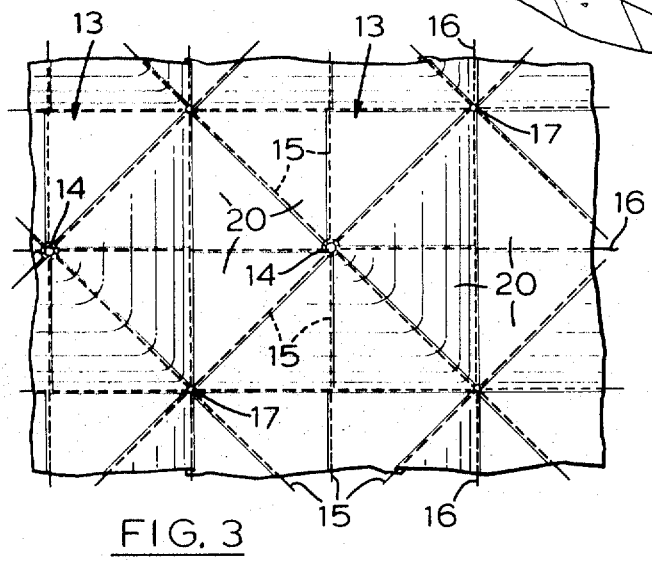
FIG. 3 is a fragmentary plan view of the membrane.

The city over which the shelter is constructed includes buildings 1 and gardens such as 2, and near its perimeter is a highway or ring road 3. The city is drained by a system of underground sewers 4. The shelter itself comprises a flexible membrane 5 having a generally horizontal portion 6 supported at a height of, say, 1000 feet, and a peripheral sloping edge 7 reaching to the ground 8 and covering the highway 3. Extending between the edges of the horizontal portion 6 and the ground are side curtains 9, which bound the space 10 enclosed within the shelter. The shelter may be constructed with pockets 11, which are open to atmosphere, these pockets being provided at certain gardens 2 and possibly other areas that are not to be enclosed.

The membrane 5 is supported by air within the space 10 at a pressure which is greater than atmospheric by an amount sufficient to bear the weight of the membrane and parts connected to it. This air flows into the enclosed space as a result of the "stack" effect when the temperature within the space is higher than atmospheric, or is continuously pumped by means of fans 12 into the enclosed space 10 from the outside atmosphere when the temperature within the space is near to, or lower than, atmospheric. Vent holes or valves, which will be described in greater detail, are provided in the membrane to permit the air to escape therefrom at a controlled rate. With this system the air, which may even be conditioned initially, is continuously rising, taking with it any smoke, fumes and other obnoxious gases and expelling them into the atmosphere.

Figure 4:
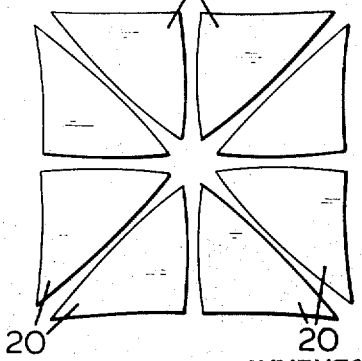
FIG. 4 shows in developed plan view the shapes of typical blanks from which a membrane section is constructed.

The membrane is composed of sections 13, which are polygonal or square in plan view, the sections being disposed in edge to edge relation and the adjacent edges being secured together to provide an extensive covering. Each membrane section is constructed from flat panels 20, typically of the shapes illustrated in FIG. 4, so that the completed membrane section is square when viewed in plan but naturally assumes a domed shape when inflated by internal air pressure. The panels 20 are adhered together with their adjacent edges overlapping. The material of the membrane is preferably reinforced polyvinyl fluoride, which is light, flexible, and relatively transparent to ultra violet and visible light. The material may consist of a Dacron or nylon scrim sandwiched between two polyvinyl fluoride layers. Each membrane section has a central vent hole or valve 14, and is integral with a system of reinforcing or tension cables, including radially extending cables 15 and peripheral cables 16. The cables 15 and 16 may be of nylon or Dacron and are integrally joined to the material of the membrane along their lengths, the cables being located between the overlapping edges of the panels 20 before the latter are adhered together. These tension cables reinforce the membrane and carry the tensile stresses induced in the membrane. The membrane sections are secured together edge to edge in uch a way that each tension cable meets a plurality of ther tension cables at a common point.

The membrane is tethered to the ground by means of system of tethering cables 17, each tethering cable being onnected to the tension cables at points at the edges f the membrane sections, and being common to a plurality f tension cables of different sections. In the present exmple the connections between the tethering cables and he tension cables are made at the corners of the memrane sections, and so it will be seen that there are, in the ase of a very large shelter, substantially the same numer of tethering cables as sections.

Considering the forces acting on the shelter,

Let N be the number of membrane sections, which is ssumed to be equal to the number of tethering ables 17;

Let $T_T$ be the tension in the tethering cables 17;

Let $T_R$ be the tension in the radial cables 15;

Let $T_P$ be the tension in the peripheral cables 16;

Let A be the angle of inclination of the cables 15 to ie horizontal at the corners of the membrane sections;

Let B be the angle of inclination of the cables 16 to ie horizontal at the corners of the membrane sections;

Let P be the difference between the internal pressure nd atmospheric pressure; and Let X be the area of a membrane section projected in horizontal plane. Then the following relations will ollow 1) $$T_T=4T_R \text{ Sin } A+4T_P \text{ Sin } B$$

2) $$NT_T=NPX$$

ince $T_R$ and $T_P$ may be considered to be proportional nly to the tension in the membrane $T_M$, we may write $$T_R=K_1T_P=K_2T_M$$

here $K_1$ and $K_2$ are constants.

Then $$PX=4K_2T_M\left[\text{Sin } A+\frac{1}{K_1}\text{Sin } B\right]$$

Therefore $$T_M=\frac{PX}{4K_2\left[\text{Sin } A+\frac{1}{K_1}\text{Sin } B\right]}$$

: is therefore seen that the tension in the membrane is ependent upon the internal pressure, the areas of the ndividual sections, and the shape or configuration of the nembrane, but is not dependent upon the total area of the nembrane.

The membrane sections assume a domed shape and so ie upper surface of the membrane provides a system of rainage channels 18, from which water is drained by ipes extending from these channels to the ground. Ideally ie tethering cables 17 are tubular and open at their pper ends into the channels 18. The cables 17 serve as he drain pipes and terminate at their lower ends at rains 19 which communicate with the main sewage sysem 4. Alternatively the water led from the drainage hannels may be diverted to a storage reservoir. In a refineient of the invention electrical heating elements may be icorporated in the membrane for melting snow or ice ettling on its upper surface, although in most climatic onditions the temperature of the enclosed space itself, hich will remain fairly stable, will be sufficient to melt ny ice or snow settling on the membrane.

In another refinement the panels 20 on the eastern and vestern sides of the domed membrane sections are coated r impregnated with a material to intercept or reflect the un's rays, the panels on the northern and southern sides eing uncoated, whereby a larger proportion of solar eat is intercepted or reflected in the summer than the vinter, when the sun is low in the sky.

The invention therefore provides a form of shelter hich may enclose a very large city of many square miles in area, without presenting any serious problems relating to the supporting of the shelter, the tensile stresses induced in it, or the drainage of rain water from its top surface. Air pollution within the space can be controlled, since the general air flow is such that noxious gases are carried upwards and removed through the vent holes.

Aerodynamic considerations show that an air-inflated shelter of the kind described is particularly resistant to side winds, even gales and hurricanes being deflected over its top. In order to prevent down-draughts or other disturbances at the vent holes, the latter may be fitted with cowls, and the size of the openings may be restricted, preferably in accordance with internal air pressure, during periods of high wind to compensate for the air foil effect over the convex surface of each section.

Entrances and exits at the edges of the sheltered area are devised to minimize leakage of air from the enclosed space. The entrances and exits for pedestrians may be provided with air locks, but in the case of the larger openings for vehicles labyrinth seals can be provided.

The choice of materials for the membrane will depend upon the conditions under which it is to be used. The panels of the membrane sections may be heat-sealed together, but are preferably secured together by means of an adhesive. In the latter case, any changes in the properties of the adhesive with age, and under cold and hot weather conditions, or under the influence of sunlight, may need to be taken into consideration. Furthermore, polyvinyl fluoride is the preferred material for the panels because it is relatively transparent to ultra violet light, but in the case of a shelter which is exposed to ultra violet light for a long period of time, it will be desirable to reinforce the panels and, [membrance] *membrane* sections with glass fibres or steel wires rather than synthetic fibres, since the latter can deteriorate when subjected to ultra violet radiation.

What I claim as my invention is:

1. A shelter for covering a large ground area comprising a flexible membrane spanning the area and providing an enclosed space, the space being bounded by a side curtain, tension cables reinforcing the membrane to bear the tensile stresses induced therein, tethering cables connected between the tension cables and the ground, and air supply means for maintaining the air pressure within the space greater than atmospheric by an amount sufficient to support the membrane, wherein the membrane consists of a plurality of sections disposed in edge to edge relation and secured together at their adjacent edges, each section being integral with its own system of said tension cables and the tethering cables being connected to the tension cables at the edges of the sections, each section being shaped to form a dome when inflated by the air within the enclosure [and having an outlet for escape of air], each tethering cable being common to a plurality of tension cables of different sections and meeting at a point whereby the tensile stress induced in the membrane is substantially independent of the number of sections.

2. A shelter according to claim 1, in which the upper surface of the membrane provides a system of drainage channels defined by cooperating sides of adjacent membrane sections, the channels communicating with drainage pipes passing through the membrane and extending to the ground.

3. A shelter according to claim 2, in which the tethering cables are tubular and constitute the drainage pipes.

4. A shelter according to claim *8* [1], in which the outlets are provided with valves for regulating the escape of air therefrom.

5. A shelter according to claim 1, in which each domed section is a regular polygon in plan view, [the outlet being centrally positioned,] and the system of tension cables [comprising] *comprises* peripheral cables along the edges of the section and radially extending cables terminating at the peripheral cables, the tethering cables being anchored to the tension cables at the corners of the polygon.

6. A shelter according to claim 5, in which each domed section is square in plan view.

7. A shelter according to claim 6, in which each domed section is constructed from flat panels adhered together with their adjacent edges overlapping, the tension cables being located between the overlapping edges before the adhering operation.

*8. A shelter according to claim 1, in which each of said sections is provided with an outlet for the escape of air.*

*9. A shelter according to claim 6, in which each domed*

*section is provided with a centrally positioned outlet for the escape of air.*

References Cited

The following references, cited by the Examiner, are of record in the patented file of this patent or the original patent.

UNITED STATES PATENTS

| | | | |
|---|---|---|---|
| 3,123,085 | 3/1964 | Dermateu | 52—2 |
| 3,169,542 | 2/1965 | Neumark | 52—2 |

REINALDO P. MACHADO, Primary Examiner